Aug. 12, 1969    G. ABRAHAM    3,460,601
ADJUSTABLE BLIND MECHANISM
Filed Nov. 1, 1967    4 Sheets-Sheet 1
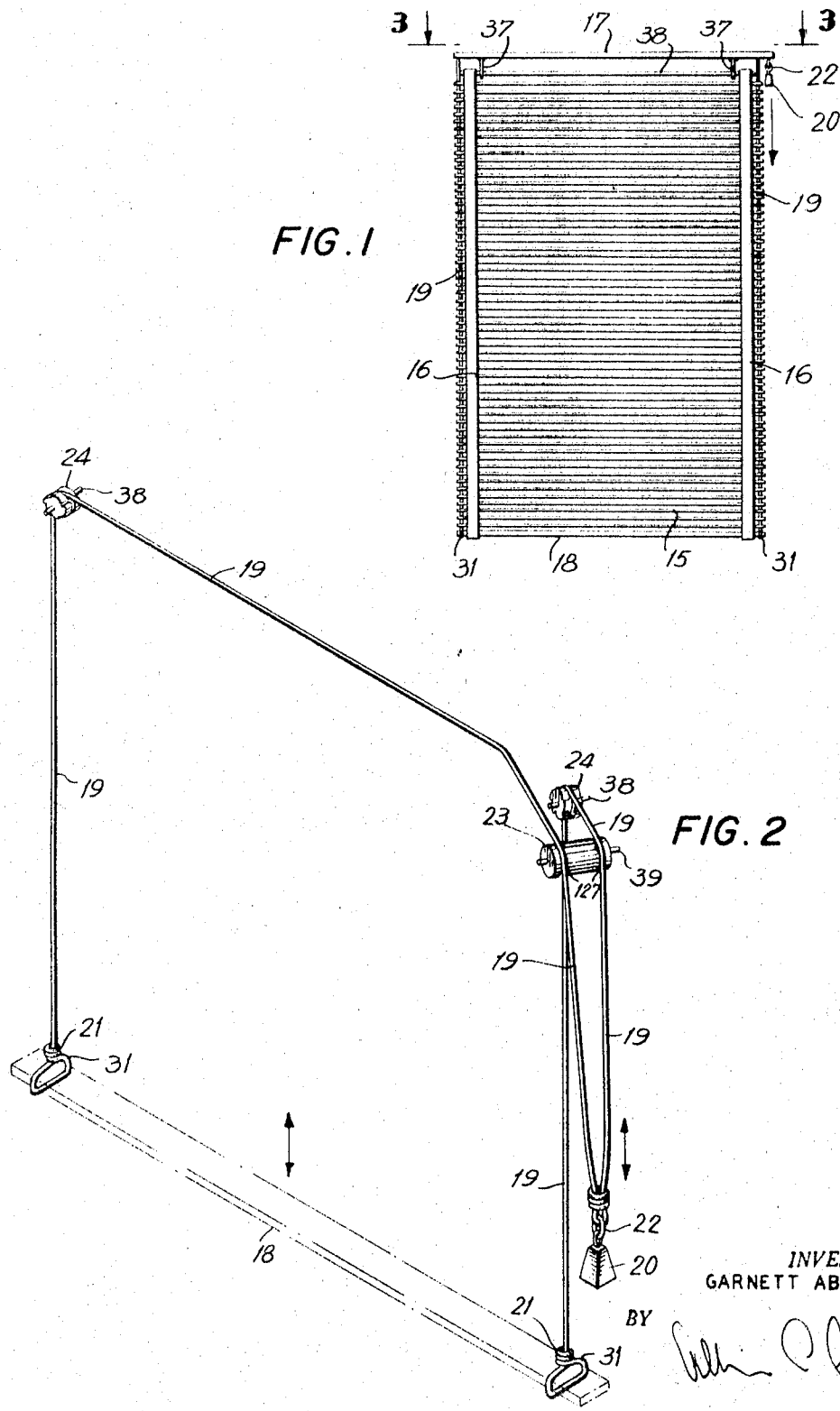
INVENTOR.
GARNETT ABRAHAM

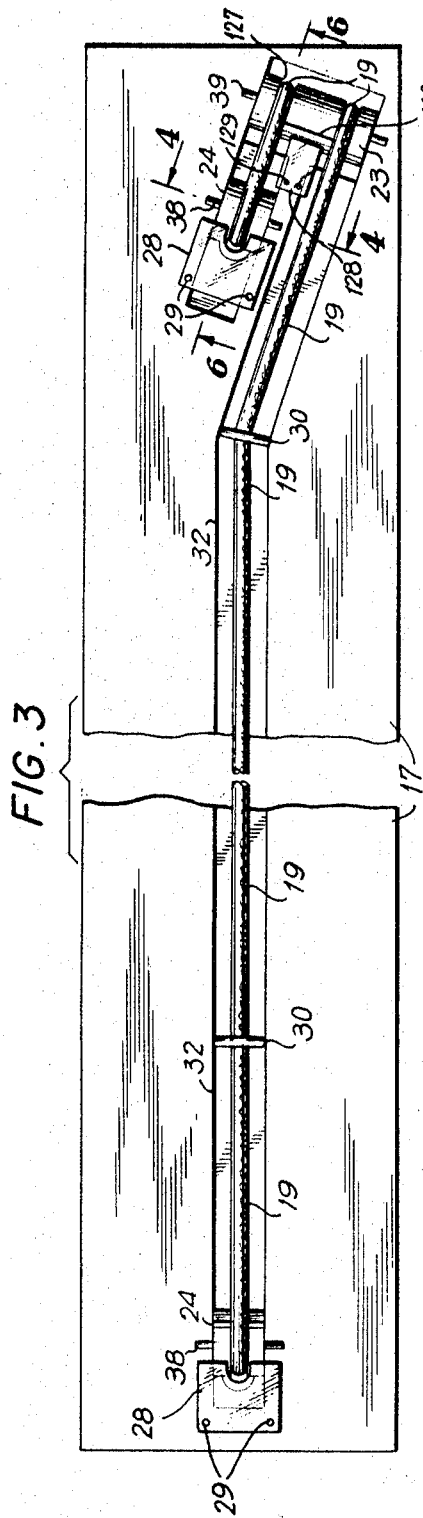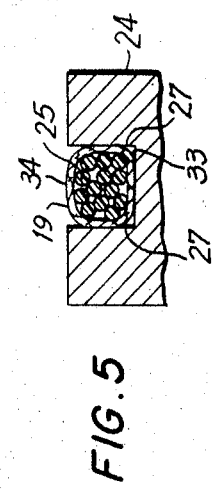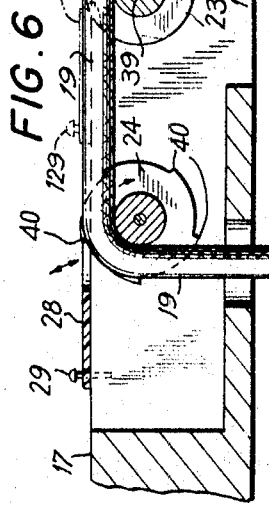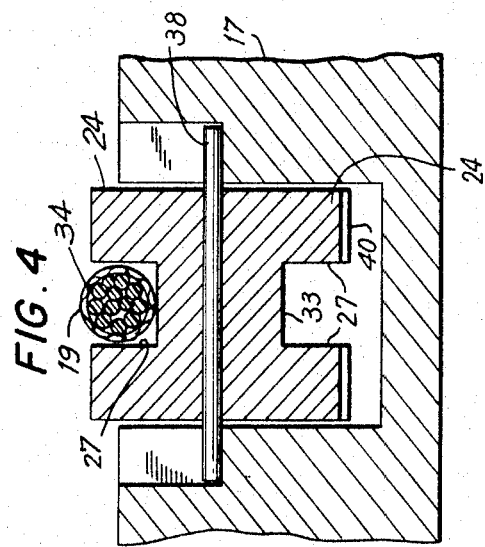

Aug. 12, 1969   G. ABRAHAM   3,460,601
ADJUSTABLE BLIND MECHANISM
Filed Nov. 1, 1967   4 Sheets-Sheet 3
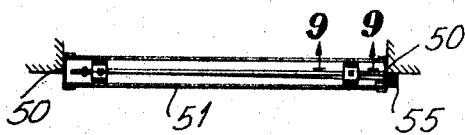
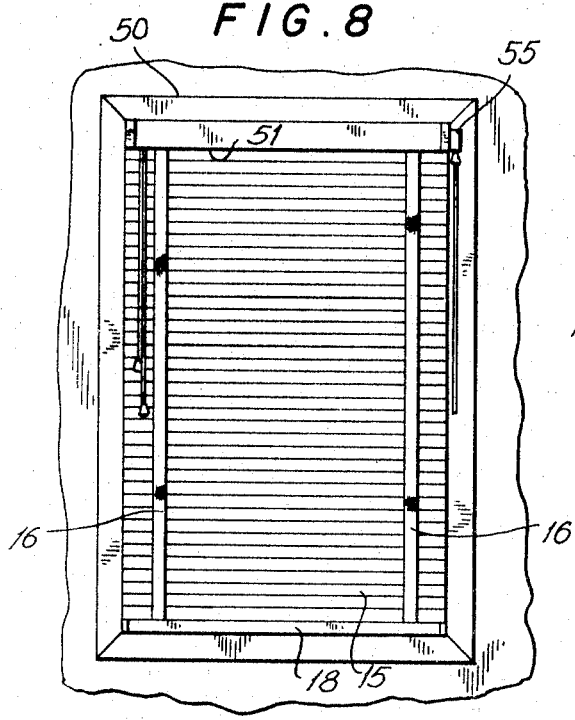
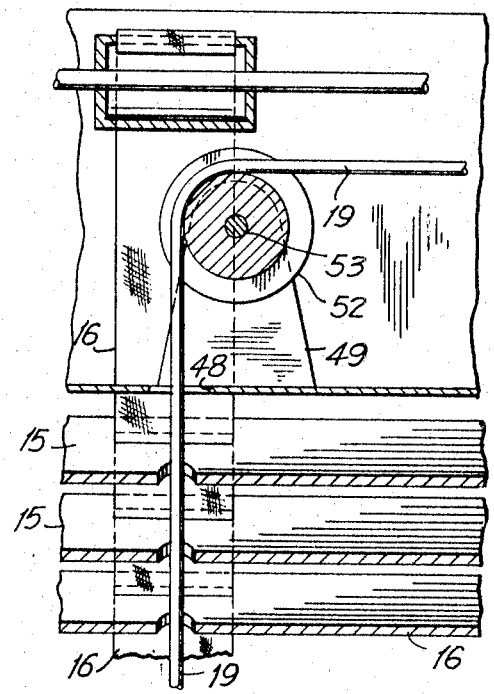
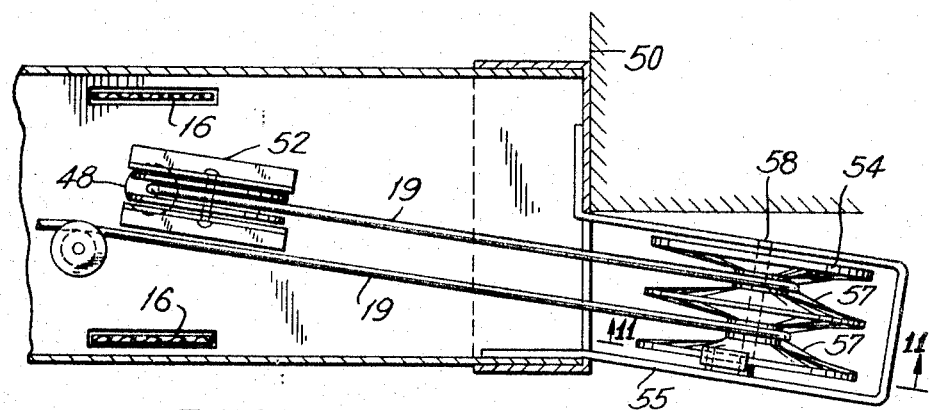
INVENTOR.
GARNETT ABRAHAM
BY Aug. 12, 1969   G. ABRAHAM   3,460,601
ADJUSTABLE BLIND MECHANISM
Filed Nov. 1, 1967   4 Sheets-Sheet 4
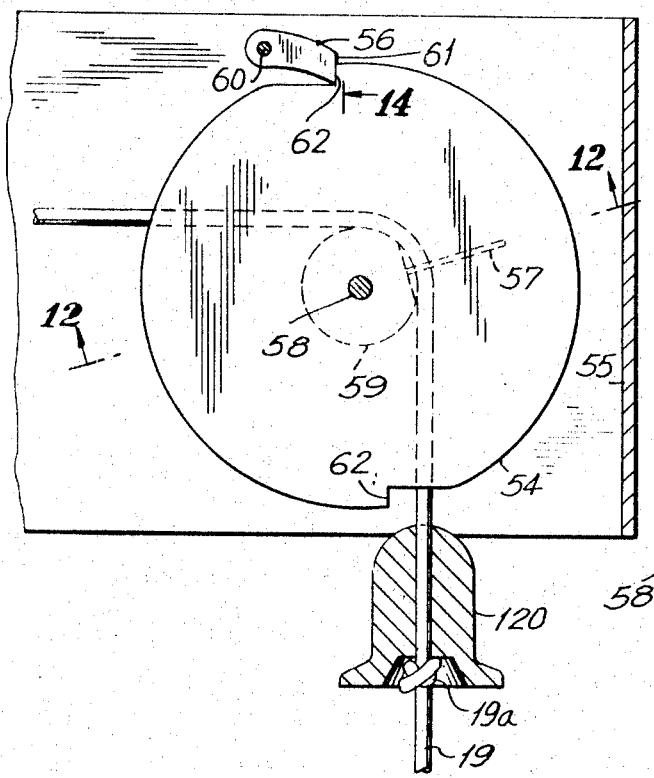
FIG. 11
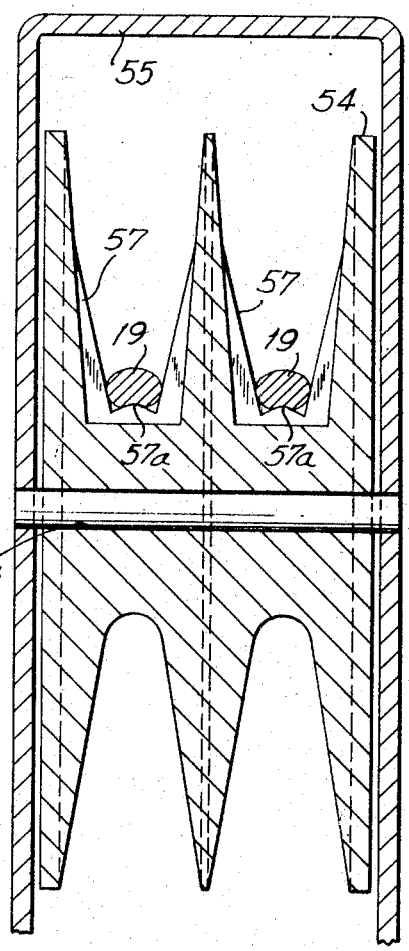
FIG. 12
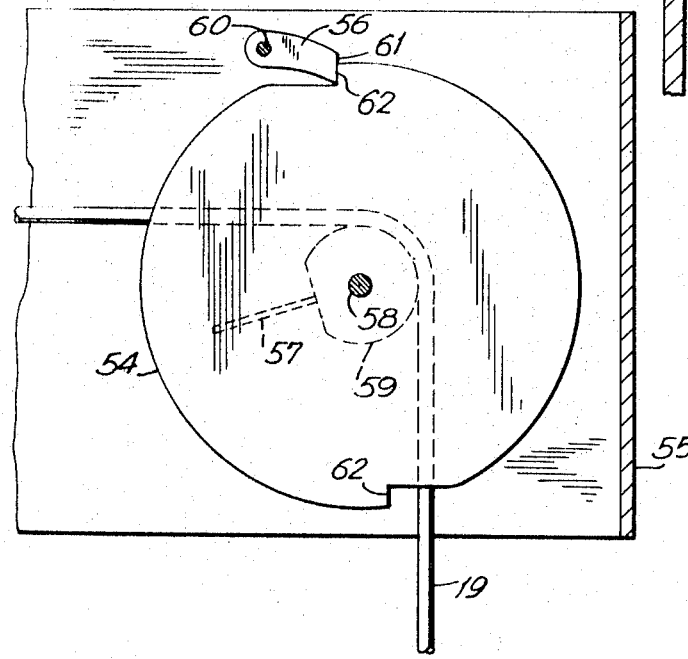
FIG. 13
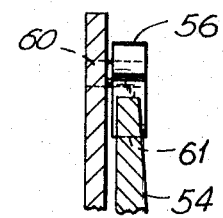
FIG. 14
INVENTOR.
GARNETT ABRAHAM
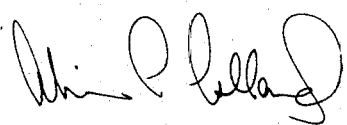
BY United States Patent Office 3,460,601
Patented Aug. 12, 1969

3,460,601
ADJUSTABLE BLIND MECHANISM
Garnett Abraham, 215 Manor Road,
Staten Island, N.Y. 10314
Continuation-in-part of application Ser. No. 610,071,
Jan. 18, 1967. This application Nov. 1, 1967, Ser.
No. 679,672
Int. Cl. E06b 9/322
U.S. Cl. 160—168                                14 Claims

ABSTRACT OF THE DISCLOSURE

An adjustable blind mechanism for use with Venetian blinds and the like wherein the control cords of the blind are trunnioned around ratchet pulleys which rotate when the blind is raised and grip the control cord when held in tension by a counterweight to maintain the blind in a stable fixed position. The blind may be raised or lowered by directly lifting or pulling down the bottom rail, or by use of the counterweighted pull cords.

This is a continuation-in-part of application, Ser. No. 610,071, filed Jan. 18, 1967, now abandoned.

The present invention relates to Venetian blinds.

More specifically, the present invention relates to a blind having a simplified construction and embodying a novel arrangement of pulleys, cords and counterweights whereby the raising and lowering movement of the blind is accomplished with a minimum of manual effort.

Conventional types of Venetian blinds used for both commercial and residential applications have been found by both manufacturers and users to have several inherent disadvantages. Venetian blinds having wooden slats are are inherently heavy and require appreciable effort to raise. Blinds having metal slats are somewhat easier to raise, but both types cause relatively heavy wear on the operating cords, the replacement of which is time-consuming and expensive. Cord wear results from cord movement in the cord passages and corners, and by the action of the cord latch which locks the blind into position.

Another source of trouble results from jamming of the cord in the latch mechanism, generally caused by the ratchet going beyond "dead-center" as blinds are lowered too rapidly. Another basic disadvantage of conventional blinds is that the control lines are constructed from cotton cord which has a short life after repeated use of the blind.

Accordingly, a Venetian blind mechanism is provided which overcomes all of the above-described disadvantages by utilizing a control cord coupled to one or more slotted ratchet pulleys for supporting the weight of the blind. The pulleys are designed to rotate in one direction, preferably when the blind is raised. The pawls which are urged against the ratchet portion of the pulley prevent their rotation in the opposite direction, corresponding to the lowering of the blind.

In one embodiment, each of the pulleys contains an annular slot in its circumference having a width identical to the diameter of the control cord which is trunnioned in the slot. The cord is constructed from a multifibered, synthetic material and includes an external woven sheath which contains the plurality of fiber strands in a substantially circular cross-section. However, when the cord is bent around each of the ratchet pulleys and supports the weight of the blind, it has a tendency to flatten and become oval in cross-section so as to frictionally contract the walls of the slot in each of the pulleys. In order to counterbalance the tension in the lines created by the weight of the blind at one end, a suitable counterweight is connected to the opposite ends of the lines in order to maintain them in tension and in frictional contact with each of the pulleys. By carefully dimensioning, the width of the slot in each of the pulleys, it has been found possible to create a sufficient amount of frictional drag between the cords in tension and the pulley to arrest the tendency of the blind to open to its full length by the weight of its own slat members. The height of the blind may be then adjusted by merely relieving the tension in the cord by either lifting the counterweight, or the bottom of the blind, or by manually pulling down on the control lines.

In another embodiment, the ratchet pulley is provided with wedge-shaped inserts having flat gripping edges for frictionally retaining the cords of the blind in one position of the pulley. The wedge-shaped inserts form a V-shape crotch along the effective diameter of the drum of the pulley so that when the cords are trunnioned over the pulley in tension, the thin, flat edges of the inserts lock the cords in place and arrest the motion of the blind. In a manner similar to the first embodiment, adjustments to the height of the blind can be made by rotating the ratchet pulley one-half turn so that the inserts are momentarily out of contact with the cords and the cords will slip freely over its drum portion.

Therefore an object of the present invention is to provide a novel blind mechanism having a means of controlling the height of a blind obviating the need for conventional pull-cords and ratchet mechanisms usually employed for raising and lowering blinds of this type.

A still further object according to the invention is to provide a blind mechanism which may be raised or lowered by a light fingertouch control and which will maintain its desired height after adjustment.

Another object according to the invention is to provide a blind mechanism which is simple in design, inexpensive to manufacture, easy to assemble, and reliable in operation.

Other objects and features of the present invention will become apparent from the following detailed description considered in connection with the accompanying drawings, which disclose the embodiments of the present invention. It should be understood, however, that the drawings are designed for purposes of illustration only, and not as a definition of the limits of the invention, as to which reference should be made to the appended claims.

In the drawings, wherein similar reference character denote similar elements throughout the several views:

FIG. 1 is an elevation view of a Venetian blind according to the invention.

FIG. 2 is an isometric diagram according to the invention showing the arrangement of the control cord used in raising and lowering the blind.

FIG. 3 is a plan view of section 3—3 of FIG. 1, showing the arrangement of pulleys and cords at the top of the blind.

FIG. 4 is a view of section 4—4 of FIG. 3 of one ratchet pulley, including a section of the control cord not under tension.

FIG. 5 is a partial view of the same section 4—4 of FIG. 3, showing the section of control cord as normally tensioned in service by the weight of the blind and counterweight.

FIG. 6 is a view of section 6—6 of FIG. 3, showing the pulley and cord arrangement at the top of one end of the blind.

FIG. 7 is a top plan view of another embodiment according to the invention.

FIG. 8 is a front-plan view of the embodiment of FIG. 7.

FIG. 9 is a cross-sectional view along line 9—9 of FIG. 7.

FIG. 10 is an enlarged top-plan view of one end of the apparatus of FIG. 7.

FIG. 11 is a cross-sectional view taken along line 1—11 of FIG. 10.

FIG. 12 is a cross-sectional view through line 12—12 of FIG. 11.

FIG. 13 is a cross-sectional view similar to that of FIG. 11, showing the apparatus according to the invention in a different position; and FIG. 14 is a side-plan view of a detail of FIGS. 11 and 13.

Referring to FIG. 1, there is shown the Venetian blind according to the invention in a fully extended position. The blind includes a plurality of horizontally-spaced slats 5 supported in part by a pair of vertically extending, spaced-apart tapes 16 adjacent to the ends of the slats. Tapes 16 are secured at one end to a bottom rail 18 which forms the lowest slat of the blind mechanism.

The blind is also provided with an upper support member 17 having a pair of hangers 37 depending its lower surface for pivotably supporting the uppermost slat 38. Tapes 16 are secured at their top to the ends of slat 38. Tapes 16 are constructed from conventional Venetian blind tape and include horizontally-spaced webs (not shown) which maintain the horizontal spacing of slats 5 as is well known in the art. Adjacent to each of ends 5 are a pair of control cords 19 which pass through holes formed in the ends of the slats. Cords 19 terminate in a loop surrounding bottom member 18 as indicated in FIG. 2.

Referring to FIG. 2 there is shown a pictorial arrangement of control cords 19 as coupled within the blind mechanism according to the invention. The ends of cords 19 are terminated in a loop 31 around the end of bottom member 18, said loop closing upon itself at binding portion 21. A collector pulley 23, having a central ratchet, is utilized to collect cords 19. Pulley 23 is pivotably mounted at one end of support 17 by means of axle 39 and includes a pair of annular slots 127 for receiving cords 19. The center portion of pulley 23 also includes a ratchet surface having stops 140 and a pawl 128 urged thereagainst (FIGS. 3 and 6). Pawl 128 is demountably coupled to support 17 by pins 129. The ratchet of pulley 23 permits rotation in only the clockwise direction.

Each of cords 19 is trunnioned around a corresponding ratchet pulley 24 and collected at one end of the blind by pulley 23. Cords 19 are joined integrally at their collected end of the blind to form a drawstring. A counterweight 20 is fastened through ring 22 to the drawstring portion of cords 19 to provide tension to the cords at all times.

Referring particularly to FIG. 3, a plan view of the uppermost support member 17 is shown illustrating in detail the arrangement of contol cords 19. Support member 17 includes a channel 32 cut along its length to contain one extension of cord 19. Channel 32 includes a plurality of guides 30 disposed along its length to maintain the cord within the channel. At each end of member 17 cord 19 is trunnioned around pulley 24 and collected by pulley 23 at a common end of the blind. The control cord coming from the opposite end of the blind is offset at a slight angle prior to its point of collection around pulley 23. This permits the collection of cords 19 to take place toward the front portion at one end of support 17 so as to make the drawstring readily accessible to the user.

Referring to FIGS. 4-6, pulley 24 is shown pivotably supported within member 17 on axle 38. Cut through the center portion of pulley 24 is an annular slot 27 having substantially rectangular cross-section. The widths of slot 27 as well as slot 127 are designed approximately equal to the diameter of cord 19. The circumference of pulleys 24 consists of a ratchet wheel having a plurality of stops 40 for engaging pawl 28 in contact therewith. Pawl 28 is demountably coupled to support member 17 by means of fasteners 29 so as to permit pawl 28 to pivot when pulley 24 is rotated clockwise. The center portion of the engaging edge of pawl 28 is hollowed out to permit cord 19 to pass therethrough.

Cord 19 is constructed from a plurality of individually disposed center strands 25 surrounded by a woven fabric sheath 34. Strands 25 are made from a resilient synthetic fiber such as nylon, Dacron, and the like, and resist permanent deformation. Strands 25 are spirally wound within sheath 34 so that the cross-sectional profile of cord 19 remains substantially circular when no tension is applied thereto. However, due to the weight of the blind on one end of cords 19, and the pull of counterweight 20 at their opposite end, cords 19 are stressed in tension over pulleys 23 and 24 and in particular on the circumferential seat of slots 127 and 27. This causes cord 19 to flatten in the slots and assume an oval configuration, as shown in FIG. 5, so that its fabric sheath 34 becomes urged frictionally against the sidewalls of slots. The frictional contact of cord 19 with respect to each pulley extends over an angular segment of approximately 90°. This frictional drag, together with the counterbalancing effects of counterweight 20, is sufficient to offset the weight of slats 15 which gather against bottom support member 18 for any height setting of the blind.

When the blind, according to the invention, is fully extended, tapes 16 support the weight of slats 15 so that counterweight 20 need only have a weight equal to, or less than, the weight of the bottom member 18. When the blind is raised by either pulling manually downward on counterweight 20, or lifting bottom support 18 upward, pulleys 23 and 24 rotate clockwise. As the bottom portion of tapes 16 begins to pleat to permit slats 15 to gather against bottom member 18, the tension in cords 19 increases by the amount of the additional weight of slats 15 against the bottom member 18. When the blind is released at its new height position, pulleys 23 and 24 rotate momentarily counter-clockwise until one of stops 140 and 40 engage the leading surface of pawls 128 and 28 respectively, and become locked thereagainst. The tension in lines 19 produced by the suspended weight of the blind and counterweight 20 causes cord 19 to flatten within slots 127 and 27 as shown in FIG. 5, and thus frictionally bind against the walls of the slot to prevent further downward movement of the blind. It is also possible to install a small spring in front of pulley 24 in order to aid in raising cord 19 out of slots 127 and 27 when the blind is raised from the bottom rail.

In order to lower the blind, it is only necessary to lift counterweight 20 sufficiently to relieve the tension in line 19 so as to permit resilient strands 25, within the cord, to assume their original shape, as shown in FIG. 4, and permit cord 19 to slide freely within slots 127 and 27. The blind will resume a stable new position when tension is applied to cord 19. The blind may also be lowered by manually pulling downward on bottom rail 18 with a force sufficient to overcome the frictional drag on cords 19 induced by slots 127 and 27. For Venetian blinds having longer slats, it is customary to employ a center tape as well as a control cord secured to the center of bottom support 18. In this manner, a third pulley (not shown) may be pivotably supported at the center of upper support member 17 forming a duplication of the ratchet pulley assembly described herein. The center control cord may be collected on ratchet pulley 23 in a manner identical to that described for the first two control cords and coupled to counterweight 20 at the intersection of the first two control cords.

Referring to FIGS. 7 and 8, there is shown an adjustable blind mechanism which includes a box frame 51 for supporting the blind between opposing sides of window frame 50. The mechanism of this embodiment includes an extending portion 55 secured at one end of box frame 51 for containing the adjusting controls of the blind.

Referring to FIGS. 9 and 10, there is shown in detail one of the idler pulleys 52 pivoted through axle 53 on stand 49. Stand 49 is secured on the floor of box frame 51 over aperture 48 to permit idler pulley 52 to collect and distribute cord 19 through corresponding apertures in slats 15, supported between tapes 16. Cord 19 can be conventional blind cord for this embodiment of the blind. The other portion of cord 19, shown extending beyond idler wheel 52, is connected to a similar idler pulley (or pulleys) along the center or opposite end of the blind in a manner similar to that shown with respect to the first embodiment. Both portions of cord 19 are collected over a double ratchet pulley 54, pivotably mounted in extending frame 55 by means of axle 58.

Referring now to FIGS. 11–14, there is shown in detail the applicaton of ratchet wheel 54 to the adjustable blind mechanism of this embodiment. Along one edge of the circumference of pulley 54 is included a pair of rectangular slots 62, positioned diametrically opposite to one another. Slots 62 are adapted to engage the leading edge 61 of pawl 56. Pawl 56 is pivotally supported against one wall of extending frame 55 as shown in detail in FIG. 14. Pawl 56 is urged downward against the circumference of pulley 54 either by gravity, or by a spring (not shown), so that it is in continuous engagement with pulley 54.

The effective diameter 59 of ratchet pulley 54 as shown in broken line, has been relieved along one side to permit the insertion of V-shaped wedge pieces 57 into the drum of pulley 54. Wedge pieces 57 are constructed, for example, from thin gauge metal, is tapered in width so that its flat edges and projecting base portion 57a will grip cord 19 from three sides at the effective diameter 59 of pulley 54. The free ends of cord 19 are terminated at knot 19a in a bell-shaped counterweight 120. Counterweight 120 operates similar to that of the embodiment described with respect to FIGS. 1–6 and provides tension in cords 19 so that they will be urged against the flat edges of wedge-shaped pieces 57 as shown in detail in FIGS. 11 and 12. Wedge shaped pieces 57 serve most effectively as a stop for cords 19 when they are positioned along the approximate 90 degrees arc-of-contact of the effective diameter 59 of pulley 54. At least one of the stops 62 is positioned on the circumference of wheel 54 to permit wedge shaped pieces 57 to engage and secure cords 19. A second notch 62, positioned along the circumferences of pulley 54, contacts pawl 56 so that wedge shaped pieces 57 will be out of engagement with cords 19 as shown in FIG. 13.

The adjustable blind according to this embodiment operates as follows:

In order to *raise* the blind, the user pulls down on counterweight 120, connected to cords 19, so as to cause ratchet wheel 54 to rotate clockwise and collect cords 19. When the desired height of the blind has been reached, the user will release counterweight 120. The weight of the blind mechanism as applied to cords 19 will cause pulley 54 to rotate counter-clockwise until pawl 56 engages one of the slots 62. If pulley 54 comes to rest in the position as shown in FIG. 11, the flat edges of wedge-pieces 57 will grip cords 19 and prevent further movement. If pulley 54 comes to rest in the position as shown in FIG. 13, the user need only pull downward on cords 19 until ratchet pulley 54 rotates 180 degrees to assume its position as shown in FIG. 11.

It is obvious, then, that in order to *lower* the blind mechanism, the user can pull downward on cords 19 until pulley 54 rotates 180 degrees into its position as shown in FIG. 13, so that the cords will be released from wedge-shaped pieces 57 and slide freely through the drum of the pulley. By lifting upward on counterweight 120, and utilizing the weight of the blind, cords 19 will slip freely over the drum of pulley 54 until the desired position of the blind is reached. The user may then lock the blind into its new position by pulling downward on cords 19 until wheel 54 assumes its locking position as shown in FIG. 11. The mass of counterweight 120 need only be designed to have a magnitude to apply a sufficient amount of tension to cords 19 with respect to the edge of the wedge shaped pieces 57 so that the edges will grip the cords to maintain the blind mechanism in its desired position. When the blind mechanism is initially secured to window frame 50, and after the blind is opened and extended down to cover the full leigth of the frame counterweight 120 can be slid along cords 19 and secured in place at the top of the blind, adjacent to frame 50 by tying knot 19a underneath the bell of the weight.

The blind mechanism according to this embodimen may also be raised or lowered by lifting upward or pulling downward on base 18 at the bottom of the blind so tha ratchet pulley 54 will rotate freely due to the tensioi applied by counterweight 120.

The blind mechanism according to the invention ma; also be used to raise and lower drapery fabrics, accordioi pleated shades of plastic or wood, and the like. In thi arrangement a tubular support rail may be employed t( support the control cords for adjusting the height of th( blind.

While only a few embodiments of the present inven tion have been shown and described, it will be understoo( that many changes and modifications may be made there in without departing from the spirit and scope of th( invention as defined by the appended claims.

What is claimed is:

1. An adjustable blind mechanism comprising;
   a horizontal support member,
   a blind depending said support member,
   a plurality of control cords secured at one end of saic blind,
   at least one ratchet pulley wheel pivotably supportec within said support member and positioned to re ceive the opposite end of said control cord, saic wheel having at least one stop disposed along it: circumference,
   a releasable pawl urged against the circumference o said wheel for contact with said stop to permit rota tion of the wheel in a single direction, and
   means coupled within said ratchet pulley for releasabl} retaining said control cords when stressed in tensioi after adjustment of said blind mechanism.

2. The mechanism as recited in claim 1 wherein eacl of said control cords comprises a plurality of resilien strands, and an external sheath surrounding said strand: for maintaining said cord in a circular cross-section whei not in tension.

3. The mechanism as recited in claim 2 wherein saic means coupled to said pulley comprises annular slo means disposed within the circumference of said whee for receiving said cords and having a width and deptl approximately equal to the circuit diameter of said non tensioned cord.

4. The mechanism as recited in claim 3 additionall} comprising a second ratchet pulley pivotably secured tc one end of said support member and having a pluralit} of said annular slots for collecting said control cords.

5. The mechanism as recited in claim 4 additionall} comprising a counterweight fastened to the collected end: of said control cords, said counterweight having a mas: sufficient to pretension and deform the control cord trun nioned in said slot means so that said external sheath i: frictionally urged against the walls of said slot means foi retaining the cord therein when said blind is adjusted tc any predetermined height.

6. The mechanism as recited in claim 5 wherein th( stops of said pulley means are directed against said paw to inhibit rotation thereof when said blind is lowered.

7. The mechanism as recited in claim 6 wherein saic control cord is slideably engaged to said pulley slot mean: when the tension in said cord is relieved so as to permi said blind to be lowered.

8. The mechanism as recited in claim 7 wherein saic blind comprises a Venetian blind.

9. The mechanism as recited in claim 1 wherein said means coupled to said pulley comprises V-shaped wedge-means inserted across the openings of said pulley parallel to its axis, said wedge means having thin edges forming constricted passageways to grip said cord under tension.

10. The mechanism as recited in claim 9 wherein said pulley comprises one stop to position said wedge-means across the path of and in contact with said control cords, and at least a second stop to position said wedge-means out of engagement with said cords to permit said cords to slide freely over the drum of said pulley means.

11. The mechanism as recited in claim 10 wherein said wedge-means additionally comprises an upstanding projection integrally formed at its base for contact with said cords.

12. The mechanism as recited in claim 11 additionally comprising an extension frame secured to one end of said support member for containing and supporting said pawl and ratchet pulley.

13. The mechanism as recited in claim 12 wherein the stops of said pulley is directed against said pawl to inhibit rotation thereof when said blind is lowered.

14. The mechanism as recited in claim 13 wherein said edges and projecting base of said wedge-means frictionally engage said cords along the effective diameter of the drum of said pulley.

References Cited

UNITED STATES PATENTS

| | | | |
|---|---|---|---|
| 444,302 | 1/1891 | Niss | 160—172 |
| 450,392 | 4/1891 | Wilson. | |
| 1,022,415 | 4/1912 | Hannan. | |
| 2,386,695 | 10/1945 | Lester-Torsen | 160—172 |
| 2,594,637 | 4/1952 | Gertzon | 160—168 |

PETER M. CAUN, Primary Examiner